Feb. 1, 1955   N. A. KENDZIA   2,701,144
VEHICLE STABILIZER
Filed May 29, 1952
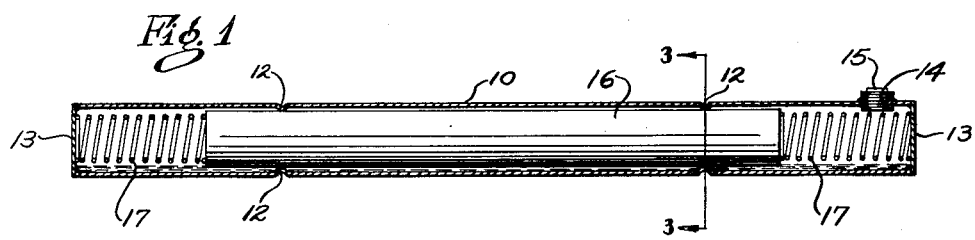
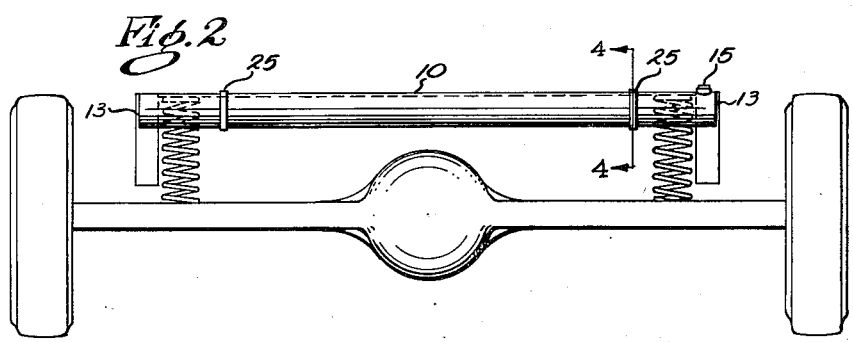
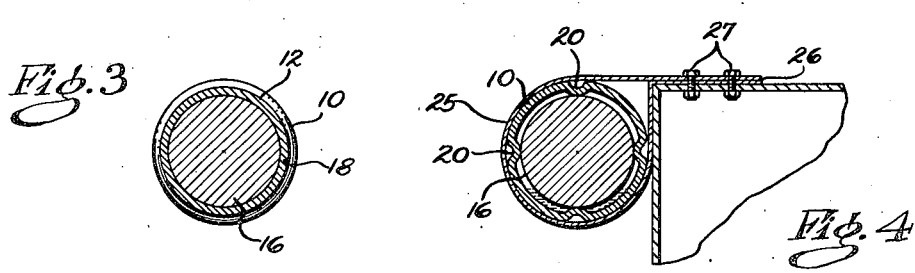
INVENTOR.
NORBERT A. KENDZIA
BY
*J. W. Douglas*
HIS ATTORNEY

2,701,144

VEHICLE STABILIZER

Norbert A. Kendzia, Parma, Ohio

Application May 29, 1952, Serial No. 290,763

2 Claims. (Cl. 280—150)

This invention relates to stabilizing devices for motor vehicles and more particularly to an anti-skid device. Although in the past anti-skid devices have been made, these devices were relatively complicated and frequently hard to assemble and install. The constant use to which these devices were subjected resulted in a problem in connection with the repair and maintenance thereof. In many cases where the stabilization was effected by a laterally moving weight, this weight was subjected to such great frictional engagement over most of its surface that it resulted in sluggish operation and thus resulted in less action in opposition to the skid and decreased stabilization.

This invention provides an anti-skid device requiring a minimum of parts which are easily, quickly, and economically fabricated.

The invention enables the provision of a stabilizing weight which is reasonably free of frictional engagement with the other parts of the unit, thus allowing more freedom of action with a resultant positive reaction in opposition to the forces that tend toward decreased stability and resultant skids of the vehicle.

Briefly, the invention comprises a housing in the form of a tube in which is disposed a weight having the same general cooperation as the tube and which weight is centered longitudinally in the housing by springs secured to the ends of the weight and engaging the ends of the housing and centrally of the housing by inwardly extending bosses or rings.

Referring now to the drawings, throughout which like parts are designated by like reference characters and more particularly to Fig. 1:

Fig. 1 is a longitudinal medial section of the stabilizing device showing the invention;

Fig. 2 is a fragmentary rear view of a motor vehicle with the invention in place and illustrating a modification thereof;

Fig. 3 is a section on the line 3—3 of Fig. 1; and

Fig. 4 is a section on the line 4—4 of Fig. 2.

The housing may comprise a tubular body 10 in preferably a length sufficient to span the side members of a vehicle frame.

The tubular body 10 is provided with end plates 13 which form end walls and close the ends in a fluid tight manner. The plates may be affixed in any suitable manner as by welding or they may be threaded cups or rings disposed on the side.

An inlet hole 14 may be provided to facilitate the partial filling of the tubular body with fluid. A pipe plug 15 is provided to seal the same after filling.

An elongated weight member 16 is provided for the body being preferably the same conformation as the tube and of a length shorter than the tube and of a diameter slightly less than the inner wall of the tube, to provide the most weight and still allow endwise movement. The weight is supported on bosses 18 inside the tube which bosses are so spaced from the ends that they always provide support for the weight. As best shown in Fig. 1, these bosses are provided by rolling an annular channel into the tube circumferential around the tube as indicated at 12.

The weight is held centered longitudinally in the housing and still permitted to move endwise in the housing, although the endwise movement is resisted by a force that increases with the amount of movement. To enable this, the end plates 13 have secured thereto a helical spring 17 which is disposed between the end plates and the weight. It will be noted that the spring is smaller in diameter than the housing. It is preferably secured to the end wall by suitable clamps or by welding. I have also found that best results are obtained if the springs are longer than the spaces between the weight and the end walls thus causing the springs to be under compression when the device is assembled. The ends of the springs may freely abut the ends of the weight, or bosses for engagement with the springs may be provided (not shown) to maintain alignment of the springs with the weight. I have found, however, that no alignment difficulties are encountered with the structure as shown. I do believe it to be important, however, that the springs do not engage the housing walls, both because such engagement would hinder their operation and because of frictional engagement with the housing.

Although the bosses for supporting the weight are provided by forming peripheral grooves in the housing, it is also within the purview of my invention to provide such bosses in other ways. For instance, Figs. 2 and 4 illustrate a series of circumferentially aligned radially displaced dimples 20, which provide peripherally displaced supports for the weight. This has a tendency to provide less friction than the structure shown in Fig. 1 and may be desirable where these devices are made for the lighter type vehicles.

The device may be secured to the vehicle in any manner. Preferably, it should be secured as far to the rear of the rear wheels as is possible and in a position where it will not affect the operation of the vehicle. It is also desirable that it be disposed at a point where it tends to lower, rather than raise, the center of gravity. In many instances, this disposition, such as to lower the gravity center, is impractical. I have found, however, that the further rearward it is placed, the more effective its operation.

A convenient means of supporting the same is shown in Figs. 2 and 4. In this instance, a strip 25 of metal is formed into loops which embrace the housing at the points where the housing is indented to form the internal bosses. The ends of the strap are brought together at 26 and secured to the frame by bolts 27.

Preferably, a small quantity of light lubricating oil is poured into the housing. There should be sufficient oil to provide ample lubrication but not such as to cause any interference with the operation.

Although many theories justifying the operation of this device have been expounded, there is some question as to the exact effect of the forces involved. So far as I can ascertain, when the vehicle starts to skid, which is usually a lateral movement of the rear of the vehicle, the weight, being at the rear, tends to resist this lateral movement. The housing, then, moves laterally relative to the weight, the spring on one side being compressed in increasing increments depending upon the violence of the skid; the resistive force due to the compression of the spring is transmitted to the vehicle in the form of a shock snubbing action smoothly and efficiently at exactly the right moment to lessen, if not stop, the skid. Although other theories of its operation may be apparent, I do not desire to be limited thereby.

It will be apparent that I have provided a device that is extremely economical to construct and easy to install. The weight being enclosed in a housing is always free to move and will not become ineffective because of accumulation of dirt or rust.

The springs being constructed in the housing realize to their best advantage all their resiliency. The weight being supported by a minimum of bearing surface is always free to move. The precompression of the springs decreases the "bump" which would ordinarily be realized and which would be annoying to the operator.

Having thus described my invention, I am aware that numerous and extensive departures may be made therefrom without departing from the spirit of my invention or the scope thereof as defined by the appended claims.

I claim:

1. A stabilizing device for a motor vehicle having a frame with transversely extending cross members at least one of which is disposed at the rear of the vehicle beyond the point of traction comprising a tube arranged to be secured to said back frame member and comprising a cylindrical chamber having closed ends, a weight disposed in the tube and comprising a solid member of a length to extend throughout most of the length of the tube spaced from the side and end walls, said side wall being deformed inwardly to provide spaced annular bearing supports spaced from the ends of the tube for said weight, spring means interposed between each end of the weight and the tube end walls and in engagement therewith, said springs being longer than the space between the ends of the weights and the tube and under a state of compression, means for securing said tube to the frame comprising members disposed around and in clamping engagement in said deformed portions and having ends secured to the frame.

2. A stabilizing device for a motor vehicle having a frame with transversely extending cross members at least one of which is disposed at the rear of the vehicle beyond the point of traction comprising a tube arranged to be secured to said back frame member and comprising a cylindrical chamber having closed ends, a weight disposed in the tube and comprising a solid member of a length to extend throughout most of the length of the tube spaced from the side and end walls, said side wall being deformed inwardly at least two points spaced from the ends a distance at least equal to the combined space between the ends of the weight and the ends of the tube to provide spaced annular bearing supports for said weight, spring means interposed between each end of the weight and the tube end walls and in engagement therewith, said springs being longer than the space between the ends of the weights and the tube and under a state of compression, means for securing said tube to the frame comprising members disposed around and in clamping engagement in said deformed portions and having ends secured to the frame, and a lubricating oil in the tube, said oil being in a quantity sufficient to lubricate the tube and less than the amount necessary to impede the longitudinal motion of the weight.

References Cited in the file of this patent

UNITED STATES PATENTS

| | | |
|---|---|---|
| 2,049,265 | Kinney | July 28, 1936 |
| 2,155,130 | Hanel II | Apr. 18, 1939 |
| 2,545,578 | Hanel III | Mar. 20, 1951 |
| 2,618,492 | Singer | Nov. 18, 1952 |
| 2,635,898 | Silverman | Apr. 21, 1953 |
| 2,658,769 | Forney | Nov. 10, 1953 |

FOREIGN PATENTS

| | | |
|---|---|---|
| 481,654 | Great Britain | Mar. 15, 1938 |